United States Patent
Weitzhandler et al.

(10) Patent No.: US 8,364,094 B2
(45) Date of Patent: Jan. 29, 2013

(54) ANTENNA ASSEMBLY FOR SERVICE STATION

(75) Inventors: Shimon Weitzhandler, RaAnana (IL); Yoav Vilnai, Tel-Aviv (IL); Avi Yalon, Ramat-Gan (IL)

(73) Assignee: Petratec International Ltd., Hod-HaSharon (IL)

( * ) Notice: Subject to any disclaimer, the term of this patent is extended or adjusted under 35 U.S.C. 154(b) by 260 days.

(21) Appl. No.: 12/530,478

(22) PCT Filed: Mar. 13, 2008

(86) PCT No.: PCT/IL2008/000349
§ 371 (c)(1), (2), (4) Date: Jul. 1, 2010

(87) PCT Pub. No.: WO2008/111075
PCT Pub. Date: Sep. 18, 2008

(65) Prior Publication Data
US 2010/0273543 A1     Oct. 28, 2010

Related U.S. Application Data

(60) Provisional application No. 60/906,515, filed on Mar. 13, 2007.

(51) Int. Cl.
*H04B 1/38* (2006.01)

(52) U.S. Cl. ...... 455/90.1; 455/90.2; 455/418; 455/419; 455/420; 455/41.2; 455/41.3; 455/63.4; 455/404.2; 455/575.9; 370/310.2; 370/338; 343/720; 141/94

(58) Field of Classification Search ............ 455/90.1, 455/90.2, 418–420, 41.2, 41.3, 63.4, 575.9, 455/404.2; 370/310.2, 338; 343/700, 720; 141/94
See application file for complete search history.

(56) References Cited

U.S. PATENT DOCUMENTS

| | | | |
|---|---|---|---|
| 4,469,149 A | 9/1984 | Walkey et al. | |
| 5,184,309 A | 2/1993 | Simpson et al. | |
| 5,605,182 A | 2/1997 | Oberrecht et al. | |
| 5,727,608 A | 3/1998 | Nusbaumer et al. | |
| 5,742,229 A | 4/1998 | Smith | |
| 5,858,501 A | 1/1999 | Malone | |
| 5,887,367 A | 3/1999 | Alvern | |
| 5,906,228 A * | 5/1999 | Keller | 141/94 |
| 5,913,180 A | 6/1999 | Ryan | |

(Continued)

FOREIGN PATENT DOCUMENTS

| | | |
|---|---|---|
| DE | 10241323 | 5/2004 |
| EP | 0349316 | 1/1992 |

(Continued)

OTHER PUBLICATIONS

Response Dated Feb. 14, 2011 to Official Action of Sep. 14, 2010 From the US Patent and Trademark Office Re.: U.S. Appl. No. 12/083,968.

(Continued)

*Primary Examiner* — Steve D Agosta

(57) ABSTRACT

Disclosed are antenna assemblies suitable for establishing wireless communication with entities that have variable or indeterminate antenna orientation, especially entities having a limited power supply, the antenna assemblies comprising two linearly polarized reception antennae (18, 20) positioned so that the orientation of the antennae define a plane. Disclosed are also service station provided with such an antenna assembly. Disclosed are also methods of establishing wireless communication in a service station between a service station controller and entities that have variable or indeterminate antenna orientation, especially entities having a limited power supply.

45 Claims, 6 Drawing Sheets

U.S. PATENT DOCUMENTS

| | | | |
|---|---|---|---|
| 5,923,572 | A | 7/1999 | Pollock |
| 5,933,788 | A * | 8/1999 | Faerber et al. ............. 455/562.1 |
| 5,944,069 | A | 8/1999 | Nusbaumer et al. |
| 6,024,142 | A | 2/2000 | Bates |
| 6,075,707 | A | 6/2000 | Ferguson et al. |
| 6,085,805 | A | 7/2000 | Bates |
| 6,089,284 | A | 7/2000 | Kaehler et al. |
| 6,232,877 | B1 | 5/2001 | Ashwin |
| 6,313,737 | B1 | 11/2001 | Freeze et al. |
| 6,317,098 | B1 * | 11/2001 | Andrews et al. ............. 343/797 |
| 6,338,008 | B1 | 1/2002 | Kohut et al. |
| 6,343,241 | B1 | 1/2002 | Kohut et al. |
| 6,374,870 | B1 | 4/2002 | Müller |
| 6,411,824 | B1 | 6/2002 | Eidson |
| 6,433,742 | B1 * | 8/2002 | Crawford ............... 343/700 MS |
| 6,560,443 | B1 * | 5/2003 | Vaisanen et al. ................ 455/73 |
| 6,648,032 | B1 * | 11/2003 | Kelrich et al. .................. 141/94 |
| 6,799,614 | B1 | 10/2004 | Smith et al. |
| 6,899,151 | B1 | 5/2005 | Latka et al. |
| 7,034,683 | B2 | 4/2006 | Ghazarian |
| 7,042,357 | B2 | 5/2006 | Girvin et al. |
| 7,119,690 | B2 | 10/2006 | Lerch et al. |
| 7,427,955 | B2 * | 9/2008 | Choi et al. ............. 343/700 MS |
| 2003/0146876 | A1 | 8/2003 | Greer et al. |
| 2004/0079799 | A1 | 4/2004 | Symonds et al. |
| 2004/0156339 | A1 | 8/2004 | Urquhart et al. |
| 2004/0203360 | A1 | 10/2004 | Yamagiwa |
| 2004/0221920 | A1 | 11/2004 | Ferguson et al. |
| 2004/0257229 | A1 | 12/2004 | Girvin et al. |
| 2006/0003739 | A1 | 1/2006 | Sasakura et al. |
| 2006/0012479 | A1 | 1/2006 | Ezra |
| 2006/0049249 | A1 | 3/2006 | Sullivan |
| 2006/0145926 | A1 | 7/2006 | Choi et al. |
| 2006/0237528 | A1 | 10/2006 | Bishop et al. |
| 2007/0250452 | A1 | 10/2007 | Leigh et al. |
| 2009/0045978 | A1 | 2/2009 | Weitzhandler et al. |
| 2009/0289113 | A1 | 11/2009 | Vilnai et al. |

FOREIGN PATENT DOCUMENTS

| | | |
|---|---|---|
| EP | 0642232 | 3/1995 |
| EP | 0805566 | 11/1997 |
| EP | 0943584 | 9/1999 |
| EP | 1099664 | 5/2001 |
| EP | 1115176 | 7/2001 |
| EP | 0729426 | 4/2003 |
| EP | 00906598 | 3/2005 |
| GB | 2400364 | 10/2004 |
| JP | 2001-101378 | 4/2001 |
| WO | WO 01/03983 | 1/2001 |
| WO | WO 02/087969 | 11/2002 |
| WO | WO 2005/021419 | 3/2005 |
| WO | WO 2005/124581 | 12/2005 |
| WO | WO 2006/044168 | 4/2006 |
| WO | WO 2006/124270 | 11/2006 |
| WO | WO 2007/003293 | 1/2007 |
| WO | WO 2007/049273 | 5/2007 |
| WO | WO 2007/049274 | 5/2007 |
| WO | WO 2008/090539 | 7/2008 |
| WO | WO 2008/096361 | 8/2008 |
| WO | WO 2008/111075 | 9/2008 |
| WO | WO 2009/050662 | 4/2009 |

OTHER PUBLICATIONS

Response Dated Jul. 6, 2010 to Official Action of Jan. 5, 2010 From the US Patent and Trademark Office Re.: U.S. Appl. No. 12/083,968.
Communication Pursuant to Article 94(3) EPC Dated Aug. 12, 2011 From the European Patent Office Re. Application No. 07849601.5.
Response Dated Oct. 21, 2010 to Official Action of Jun. 22, 2010 From the US Patent and Trademark Office Re. U.S. Appl. No. 12/083,979.
Written Opinion Dated Mar. 20, 2008 From the International Searching Authority Re.: Application No. PCT/IL06/01222.
Official Action Dated Apr. 27, 2011 From the US Patent and Trademark Office Re.: U.S. Appl. No. 12/083,968.
Response Dated Mar. 22, 2011 to Communication Pursuant to Article 94(3) EPC of Sep. 22, 2010 From the European Patent Office Re. Application No. 08840101.3.
International Preliminary Report on Patentability Dated Apr. 29, 2010 From the International Bureau of WIPO Re.: Application No. PCT/IB2008/054248.
Response Dated Aug. 29, 2011 to Official Action of Apr. 27, 2011 From the US Patent and Trademark Office Re.: U.S. Appl. No. 12/083,968.
Notice of Allowance Dated Nov. 18, 2010 From the US Patent and Trademark Office Re. U.S. Appl. No. 12/083,979.
Office Action Dated Jul. 20, 2011 From the Israeli Patent Office Re. Application No. 190934 and Its Translation Into English.
Communication Pursuant to Article 94(3) EPC Dated Sep. 22, 2010 From the European Patent Office Re. Application No. 08840101.3.
Communication Relating to the Results of the Partial International Search Dated Oct. 20, 2008 From the International Searching Authority Re.: Application No. PCT/IL2008/000349.
International Preliminary Report on Patentability Dated Dec. 11, 2008 From the International Bureau of WIPO Re.: Application No. PCT/IL2006/001222.
International Preliminary Report on Patentability Dated Jan. 22, 2009 From the International Bureau of WIPO Re.: Application No. PCT/IL2006/001221.
International Preliminary Report on Patentability Dated Aug. 6, 2009 From the International Bureau of WIPO Re.: Application No. PCT/IL2007/001575.
International Preliminary Report on Patentability Dated Sep. 24, 2009 From the International Bureau of WIPO Re.: Application No. PCT/IL2008/000349.
International Search Report Dated Mar. 4, 2009 From the International Searching Authority Re.: Application No. PCT/IB2008/054248.
International Search Report Dated Sep. 4, 2008 From the International Searching Authority Re.: Application No. PCT/IL2008/000168.
International Search Report Dated Oct. 6, 2008 From the International Searching Authority Re.: Application No. PCT/IL2008/000349.
International Search Report Dated Jul. 10, 2008 From the International Searching Authority Re.: Application No. PCT/IL2007/001575.
International Search Report Dated Nov. 10, 2008 From the International Searching Authority Re.: Application No. PCT/IL06/01221.
International Search Report Dated Mar. 20, 2008 From the International Searching Authority Re.: Application No. PCT/IL06/01222.
Partial International Search Report Dated Jul. 10, 2008 From the International Searching Authority Re.: PCT/IL2008/000349.
Written Opinion Dated Mar. 4, 2009 From the International Searching Authority Re.: Application No. PCT/IB2008/054248.
Written Opinion Dated Sep. 4, 2008 From the International Searching Authority Re.: Application No. PCT/IL2008/000168.
Written Opinion Dated Oct. 6, 2008 From the International Searching Authority Re.: Application No. PCT/IL2008/000349.
Written Opinion Dated Jul. 10, 2008 From the International Searching Authority Re.: Application No. PCT/IL2007/001575.
Written Opinion Dated Nov. 10, 2008 From the International Searching Authority Re.: Application No. PCT/IL06/01221.
Official Action Dated Jan. 5, 2010 From the US Patent and Trademark Office Re.: U.S. Appl. No. 12/083,968.
Official Action Dated Jun. 22, 2010 From the US Patent and Trademark Office Re. U.S. Appl. No. 12/083,979.
Summons to Attend Oral Proceedings Pursuant to Rule 115(1) EPC Dated Sep. 19, 2011 From the European Patent Office Re. Application No. 08840101.3.
Official Action Dated Sep. 14, 2010 From the US Patent and Trademark Office Re.: U.S. Appl. No. 12/083,968.
Response Dated Dec. 19, 2011 to Summons to Attend Oral Proceedings Pursuant to Rule 115(1) EPC of Sep. 19, 2011 From the European Patent Office Re. Application No. 08840101.3.
Official Action Dated Jan. 4, 2012 From the US Patent and Trademark Office Re. U.S. Appl. No. 12/524,189.

Communication Under Rule 71(3) EPC Dated Jan. 27, 2012 From the European Patent Office Re. Application No. 08840101.3.

Examination Report Dated Feb. 16, 2012 From the Instituto Mexicano de la Propriedad Industrial Re. Application No. MX/a/2009/007966 and Its Summary in English.

Examination Report Dated Oct. 21, 2011 From the Instituto Mexicano de la Propriedad Industrial Re. Application No. MX/a/2008/005215 and Its Translation Into English.

Official Action Dated Mar. 12, 2012 From the US Patent and Trademark Office Re.: U.S. Appl. No. 12/083,968.

Official Action Dated Aug. 16, 2012 From the US Patent and Trademark Office Re. U.S. Appl. No. 12/524,189, PTO Mail date Aug. 16, 2012.

* cited by examiner

ANTENNA ASSEMBLY FOR SERVICE STATION

RELATED APPLICATIONS

This application is a National Phase of PCT Patent Application No. PCT/IL2008/000349 having International filing date of Mar. 13, 2008, which claims the benefit of U.S. Provisional Patent Application No. 60/906,515 filed on Mar. 13, 2007. The contents of the above applications are all incorporated herein by reference.

FIELD AND BACKGROUND OF THE INVENTION

The present invention relates to the fields of purchase authorization and radio frequency communication and, more particularly, to antenna assemblies, methods and service stations useful, for example, for fuel-purchase authorization.

In the past a gas station was primarily a location to purchase fuel for a vehicle and occasionally to purchase comestibles and products associated with vehicular operation. Increasingly, gas stations are transforming into service stations, becoming one of the most important retail venues in industrialized society. The reasons for the increasing importance of service stations as retail venues, as well as the nature of the purchases, result from the relative advantages of service stations which are dictated by the primary purpose of service stations: efficiently providing fuel to vehicles.

To be successful as a gas station, a service station must generally be located on a heavily traveled road with large area available for both high speed entrance and egress, many fuel-dispensing locations (i.e., fuel pumps), arranged for high-throughput refueling of many continuously arriving vehicles.

One preferred method for increasing the attractiveness of a service station is through the use of automated payment for fuel. In such methods, a vehicle is equipped with a vehicle identification tag storing data relating to the vehicle identity and a payment method. Each fuel-dispensing location is provided with a vehicle identification tag-reader including using a tag reading transceiver provided with a vehicle identification tag reader antenna that is configured to wirelessly read the vehicle identification tag.

In order to reduce fuel theft and in order to reduce interference between identification tag readers, it is accepted to limit the range of the wireless communication (as measured between the vehicle identification tag and the vehicle identification tag reader antenna), typically to only a few centimeters. Thus, vehicle identification tags are generally located in proximity of a vehicle refueling port and vehicle identification tag reader antennae are generally secured to a fuel-dispensing nozzle associated with a specific fuel-dispensing location so that the tag reader is able to read the identification tag substantially only when the fuel-dispensing nozzle engages the vehicle refueling port.

Generally, associated with the vehicle identification tag reader is a tag reader station communication transmitter, configured to forward information read from a vehicle identification tag to a service station controller. A tag-reader station communication transmitter is generally in wired communication with the tag reading transceiver itself and is physically attached to the fuel-dispensing nozzle or to the fuel dispensing location with which the fuel-dispensing nozzle is associated. The tag-reader transmitter is generally in wired communication with a service station controller, for example through the underground wired communication channels that exist in any case between the service station controller and the different fuel-dispensing locations.

When it is desired to purchase fuel, a fuel dispensing nozzle of a fuel dispensing location is placed inside the refueling port of a vehicle, bringing the tag reading antenna of the tag reader in wireless communication range with the vehicle identification tag. Information (such as vehicle identity) read through the tag reading antenna is forwarded to the service station controller by the tag reader station communication transceiver along with the identity of the fuel-dispensing nozzle with which the respective tag reader is associated. Based on the applicable rules, the service station controller optionally communicates an authorization signal including if, under what conditions and how much fuel to dispense to the identified vehicle through the fuel-dispensing nozzle.

In a large part due to the use of wired communication between the various subsystems especially between the identification tag reading antenna and the tag reading transceiver, and between the tag reader station communication transmitter and the service station controller, installation, maintenance and upgrading of an automated fuel payment system is difficult. Once a fuel station has invested in a given system, it is often prohibitively expensive to replace the system, causing service stations to use obsolete automated fuel payment systems.

In the art, a number of systems and methods for automated fuel payment have been proposed that overcome some of the disadvantages of wired systems such as the discussed above.

In the PCT patent applications published as WO 2007/049273 and WO 2007/049274 of the Applicant are taught wireless vehicle identification tag readers as well as systems and methods using the wireless vehicle identification tag readers. Each wireless tag reader is configured to be secured to a fuel dispensing nozzle and includes a wireless tag reading transceiver functionally associated with an identification tag reading antenna, a wireless station communication transceiver and an autonomous power source. In FIG. 1, a nozzle-mounted wireless vehicle identification tag reader 10 is depicted secured to a fuel dispensing nozzle 12.

When it is desired to purchase fuel using such wireless systems, a fuel dispensing nozzle (such as 12 in FIG. 1) of a fuel dispensing location is placed inside the refueling port of a vehicle, bringing the tag reading antenna of the vehicle identification tag reader (such as contained within the casing of tag reader 10) in wireless communication range with the vehicle identification tag. Information (such as vehicle identity) read by the tag-reading transceiver of the tag reader through the tag reading antenna is forwarded to the service station controller by a wireless station communication transceiver (such as contained within the casing of tag reader 10) along with the identity of the fuel-dispensing nozzle with which the tag reader (e.g., tag reader 10) is associated. Based on the applicable rules, the service station controller optionally communicates an authorization signal including if, under what conditions and how much fuel to dispense to the identified vehicle to the fuel dispensing controller which forwards the authorization signal to the appropriate fuel dispensing location through the existing wired communication.

Installation and removal of a nozzle-mounted wireless vehicle identification tag reader such as 10 is easy, allowing simple and cheap hardware upgrading. Maintenance is not difficult, but due to the simplicity of the wireless tag readers and the ease with which the wireless tag readers may be attached and reattached to a fuel dispensing nozzle, it is often simpler and cheaper (and thus preferred) to discard a malfunctioning or spent wireless tag reader.

In the above referenced PCT patent applications are also taught vehicle-mounted wireless active identification tags including a radio-frequency transmitter used in some embodiments to communicate with a service station controller. Such vehicle-mounted wireless active identification tags are preferably self-contained and are provided with an autonomous power source to prevent tampering or abuse.

A problem with the teachings of the above-referenced PCT patent applications is that the wireless communication systems described to date are not sufficiently robust, so that under certain conditions a service station controller fails to establish or maintain wireless communication with a transmitter of a nozzle-mounted vehicle identification tag reader or of a vehicle-mounted active identification tag. As is clear to one skilled in the art, the robustness of communication during any type of commercial transaction, especially high throughput commercial transactions such as common in service stations, is critical.

The Inventor has identified that one of the challenges encountered when implementing wireless communication between a service station controller and a nozzle-mounted vehicle identification tag reader or a vehicle-mounted active identification tag is related to antenna polarization.

As is known to one skilled in the art, due to the limited number of available radio-frequencies there is a strict allocation of radio-frequencies for any given application. The most readily available frequencies for use for automated fuel payment system are very high frequencies (VHF, 30 MHz to 300 MHz) and ultra high frequencies (UHF, 300 MHz to 3 GHz). Such frequencies are very susceptible to coupling loss resulting from mismatch between the polarization of a transmission antenna and a reception antenna, e.g., between the transmission antenna of a nozzle-mounted vehicle identification tag reader or of a vehicle-mounted active identification tag and the reception antenna of the receiver of the service station controller.

It is known in the art when using wireless VHF or UHF communication to orient the reception and transmission antennae relatively close to vertical (the Y axis, where the X-Z plane is defined to be substantially parallel with the ground), for example, as is known from vehicle-mounted or portable radio frequency receivers and transmitters.

In an automated fuel payment system it is not practical to ensure sufficiently similar orientation of the reception antenna of a receiver of a service station controller and the transmission antenna of a nozzle-mounted transmission antenna of a vehicle identification tag reader transmitter. A fuel dispensing nozzle in place in a refueling port of a vehicle may be in virtually any orientation and depends on many factors including the distance from the fuel dispensing location which the vehicle is parked, the angle at which the vehicle is parked, the type of vehicle (motorcycle, scooter, automobile, SUV, light truck) as well as the make and model of the vehicle.

In an automated fuel payment system it is not practical to ensure sufficiently similar orientation of the reception antenna of a receiver of a service station controller and the transmission antenna of a vehicle-mounted active identification tag. The fact that the wireless transmitters is vehicle-mounted means that the exact orientation of the transmission antenna relative to the receiver antenna of the service station depends on where the vehicle has stopped in the service station, the type, make and model of the vehicle.

In the art it is also known to provide wireless VHF and UHF communication systems with excess transmission power so even if there is a large polarization mismatch between the transmission antenna and the reception antenna, sufficient signal is received, albeit with greater than usual noise. It is impractical to provide a small, portable and cheap transmitter such as a vehicle identification tag reader transmitter with excess transmission power. First, as the tag reader transmitter is mounted on a fuel dispensing nozzle, the transmitter is in close proximity to explosive gasoline fumes. The higher the power of such a transmitter the more likely it is that the transmitter produces sparks or generates excess heat, potentially leading to a catastrophic situation. Further, in the above-referenced PCT patent applications are disclosed embodiments of self-contained vehicle-identification tag readers with integral power supplies. It is preferred that such tag readers use as little energy as possible to allow reduction of the size and the capacity of the integral power supply to allow reduction of price of the tag reader and to reduce maintenance costs related to recharging and replacing the power supplies of such tag readers. It is also clear that it is impractical to provide a self-contained vehicle-mounted active identification tag including an autonomous power source with excess transmission power.

In the art it is also known to provide wireless VHF and UHF communication systems with antennas having an adjustable orientation. When polarization mismatch is identified between a transmission antenna and a reception antenna, one or both antennae are moved to reduce polarization mismatch until a reasonable signal is received. Automatically adjustable antenna are complex, expensive, difficult to implement and susceptible to malfunction. Further, as the reception antenna associated with the receiver of a service station controller must typically communicate with a plurality of differently oriented nozzle-mounted vehicle identification tag readers and a plurality of differently oriented vehicle-mounted active identification tags, it is impractical to use an adjustable reception antenna. Further, as noted above it is desirable that a nozzle-mounted vehicle identification tag reader or vehicle-mounted active identification tag be cheap, simple, energy efficient, small and reliable, all properties that render the use of an adjustable transmission antenna impractical.

In the art it is also known to provide wireless VHF and UHF wireless communication systems with circularly polarized antennae. Circularly polarized antennae are generally more expensive, complex and bulky than other antenna types.

In the art it is also known to provide wireless VHF and UHF wireless communication systems with low-gain antennae. Low gain VHF and UHF transmission antennae are inefficient, wasteful of power, have a relatively short range and have relatively high noise.

In the PCT patent applications published WO 2007/049273 is taught the use of wireless relays between vehicle identification tag reader transmitters and a service station controller receiver as additional components of an automated fuel payment system. By shortening communication ranges and by increasing the number of communication paths available between a given vehicle-identification tag reader and a service station controller, a more robust system is achieved. This is not an ideal solution due to the added expense of manufacture, installation and maintenance of wireless relays.

It would be highly advantageous to have a communication system for a service station allowing robust wireless communication between a service station controller and one or more moveable transmitters such as vehicle-mounted or fuel-dispensing nozzle mounted transmitters. It would be highly advantageous that the wireless communication be simple and cheap to maintain and produce.

SUMMARY OF THE INVENTION

The present invention is of antenna assemblies, of service stations provided with such antenna assemblies and methods for establishing wireless communication in a service station between a service station controller and wireless transmitters having limited power supplies (that is to say, generally having self-contained power supplies) such as fuel dispensing nozzle mounted vehicle identification tag readers or vehicle mounted transmitters such as second vehicle identification tags described in the PCT patent applications published as WO 2007/049273 and WO 2007/049274. Embodiments of the present invention successfully address at least some of the disadvantages of the prior art, by providing robust communication between a service station controller and wireless transmitters having limited power supplies.

According to some aspects of the teachings of the present invention there is provided an antenna assembly, comprising: a) a first linearly polarized antenna; and b) a second linearly polarized antenna, positioned so that the orientation of the second antenna is at an angle relative to the orientation of the first antenna so as to define a plane having a front side and a back side wherein the first antenna and the second antenna are configured to function as reception antennae wherein the first antenna is configured to function as a reception antenna substantially independently from the second antenna. In embodiments, an antenna assembly of the present invention further comprises c) a radio frequency receiver functionally associated with the first antenna and the second antenna.

In embodiments, the first antenna is an omnidirectional antenna. Suitable antenna types for implementing a first antenna of the present invention include, but are not limited to, monopole, simple rod, whip, dipole, folded dipole, half wave, J-Pole, loop, large loop, and microstrip antennae.

In embodiments, the second antenna is an omnidirectional antenna. Suitable antenna types for implementing a second antenna of the present invention include, but are not limited to, monopole, simple rod, whip, dipole, folded dipole, half wave, J-Pole, loop, large loop, and microstrip antennae.

In embodiments, the first antenna and the second antenna are configured for configured for reception of UHF or VHF wavelengths.

In embodiments, the first antenna and the second antenna are configured for reception of substantially the same wavelengths.

In embodiments, the angle between the orientation of the first antenna and the orientation of the second antenna is not less than about 45°, not less than about 60° and even not less than about 75°. In embodiments, the angle between the orientation of the first antenna and the orientation of the second antenna is approximately 90°.

In embodiments, an antenna assembly of the present invention further comprises a radio frequency reflector configured to reflect radio frequency radiation to a front side of the plane defined by the first and second antennae, thereby limiting the. In embodiments, such a reflector is a plate or screen is positioned at the back side of the plane defined by the orientation of the first and second antennae.

In embodiments, the first antenna and second antenna are configured to function as transmission antennae. In such embodiments it is preferred that the angle between the orientation of the first antenna and the orientation of the second antenna is approximately 90° so that there be minimal or substantially no interaction between the antennae during simultaneous transmission. In embodiments, an antenna assembly of the present invention further comprises a radio frequency transmitter functionally associated with the first antenna and the second antenna.

In embodiments, an antenna assembly of the present invention further comprises d) a third linearly polarized antenna; and e) a fourth linearly polarized antenna, positioned so that the orientation of the fourth antenna is at an angle relative to the orientation of the third antenna so as to define a plane having a front side and a back side; and wherein the third antenna and the fourth antenna are configured to function as transmission antennae. In embodiments, an antenna assembly of the present invention further comprises f) a radio frequency transmitter functionally associated with the third antenna and the fourth antenna.

In embodiments, the third antenna is an omnidirectional antenna. Suitable antenna types for implementing a first antenna of the present invention include, but are not limited to, monopole, simple rod, whip, dipole, folded dipole, half wave, J-Pole, loop, large loop, and microstrip antennae.

In embodiments, the fourth antenna is an omnidirectional antenna. Suitable antenna types for implementing a fourth antenna of the present invention include, but are not limited to, monopole, simple rod, whip, dipole, folded dipole, half wave, J-Pole, loop, large loop, and microstrip antennae.

In embodiments, the third antenna and the fourth antenna are configured for configured for reception of UHF or VHF wavelengths.

In embodiments, the third antenna and the fourth antenna are configured for reception of substantially the same wavelengths.

In embodiments, the angle between the orientation of the third antenna and the orientation of the fourth antenna is not less than about 45°, not less than about 60° and even not less than about 75°. In preferred embodiments, the angle between the orientation of the third antenna and the orientation of the fourth antenna is approximately 90° so that there be minimal or substantially no interaction between the antennae during simultaneous transmission.

In embodiments the plane defined by the third and fourth antennae is substantially parallel to or includes the plane defined by the first and second antennae.

In embodiments, an antenna assembly of the present invention further comprises g) a fifth linearly polarized antenna, positioned so that the orientation of the fifth antenna is substantially not-coplanar with the plane defined by the orientations of the first and second antennae, the fifth antenna configured to function as a reception antenna. In embodiments, an antenna assembly of the present invention, further comprises c) a radio frequency receiver functionally associated with the first antenna, the second antenna and the fifth antenna.

In embodiments, the fifth antenna is an omnidirectional antenna. Suitable antenna types for implementing a fifth antenna of the present invention include, but are not limited to, monopole, simple rod, whip, dipole, folded dipole, half wave, J-Pole, loop, large loop, and microstrip antennae.

In embodiments, the first antenna and the fifth antenna are configured for reception of substantially the same wavelengths.

In embodiments, the angle between the orientation of the fifth antenna and the plane defined by the orientation of the first and second antennae is not less than about 45°, not less than about 60° and even not less than about 75°. In embodiments, the angle between the orientation of the fifth antenna and the plane defined by the orientation of the first and second antennae is substantially 90°.

In embodiments, the fifth antenna protrudes out on the front side of the plane defined by the first and second antennae.

In embodiments, an antenna assembly of the present invention further comprises h) a sixth linearly polarized antenna, positioned so that the orientation of the sixth antenna is substantially not-coplanar with the plane defined by the orientations of the third and fourth antennae, the sixth antenna configured to function as a transmission antenna. In embodiments, an antenna assembly of the present invention further comprises a f) radio frequency transmitter functionally associated with the third antenna, the fourth antenna and the sixth antenna. In embodiments, the sixth antenna is an omnidirectional antenna. Suitable antenna types for implementing a sixth antenna of the present invention include, but are not limited to, monopole, simple rod, whip, dipole, folded dipole, half wave, J-Pole, loop, large loop, and microstrip antennae.

In embodiments, the third antenna and the sixth antenna are configured for transmission of substantially the same wavelengths.

In embodiments, the angle between the orientation of the sixth antenna and the plane defined by the orientation of the third and fourth antennae is not less than about 45°, not less than about 60° and even not less than about 75°. In embodiments, the angle between the orientation of the sixth antenna and the plane defined by the orientation of the first and second antennae is substantially 90° so that there be minimal or substantially no interaction between the antennae during simultaneous transmission.

In embodiments, the sixth antenna protrudes out on the front side of a plane defined by the first and second antennae.

According to some aspects of the teachings of the present invention, there is also provided a service station provided with a wireless communication system, comprising: a) a service station controller comprising a radio frequency receiver functionally associated with an antenna assembly as described above; b) at least one entity comprising a transmitter and an antenna, wherein the service station controller receiver and the antenna assembly are configured for reception of signals transmitted by the entity transmitter. In embodiments, at least one entity comprises a vehicle-mounted transmitter, e.g. a second identification tag as described in the PCT patent applications published as WO 2007/049273 and WO 2007/049274. In embodiments, at least one entity comprises a vehicle identification tag reader, each vehicle identification tag reader functionally associated with a fuel-dispensing location and comprising a dedicated transmitter and an antenna.

In embodiments of the service station, a service station is provided with a wireless communication system, comprising: a) a service station controller comprising a radio frequency receiver functionally associated with an antenna assembly as described above; b) at least one vehicle identification tag reader, each vehicle identification tag reader functionally associated with a fuel-dispensing location and comprising a dedicated transmitter and an antenna, wherein the service station controller receiver and the antenna assembly are configured for reception of signals transmitted by the vehicle identification tag reader transmitters.

In embodiments, in a service station of the present invention, the service station controller comprises a transmitter functionally associated with the antenna assembly and the at least one entity such as the vehicle-mounted transmitter or the vehicle identification tag reader comprises a dedicated receiver, wherein the service station controller and the entities are configured for mutual two-directional communication.

In embodiments of a service station of the present invention, an entity is a vehicle identification tag reader and the antenna of the vehicle identification tag reader is mounted on a fuel-dispensing nozzle associated with the fuel-dispensing location. In embodiments of a service station of the present invention, a vehicle identification tag reader including a respective antenna is mounted on a fuel-dispensing nozzle associated with the fuel-dispensing location.

In embodiments of a service station of the present invention, an entity is a vehicle-mounted transmitter, especially a vehicle mounted transmitter with a self-contained power source.

In embodiments, the transmission antenna of entities that are vehicle-mounted transmitters are mounted in the vehicle so that the transmission antenna will substantially always have a significant component parallel to at least one of the reception antennae of the antenna assembly. For example, in embodiments, the transmission antennae of entities that are vehicle-mounted transmitters are oriented substantially in parallel with the ground (X-Z plane) so as to have little or no component perpendicular to the ground (Y-axis) and the orientations of two reception antennae of the antenna assembly define a plane that is substantially parallel with the ground (X-Z plane). Such an orientation has an additional advantage that there is less interference with other sources of radiofrequency energy. For example, in embodiments, the transmission antennae of entities that are vehicle-mounted transmitters are oriented having a significant component substantially parallel with the Y-axis and the orientations of two reception antennae of the antenna assembly define a plane that is substantially perpendicular with the ground (X-Y or Y-Z planes).

In embodiments, the antenna assembly is mounted on a structure (such as a pole, a column, a building) so that the back side of the plane defined by the orientation of the first and second antennae substantially faces the structure and the front side substantially faces a region where the fuel-dispensing locations are found.

In embodiments, the antenna assembly is mounted on a structure so that the plane defined by the orientation of the first and second antennae is substantially parallel to the ground (X-Z plane), the back side of the plane defined by the orientation of the first and second antennae substantially faces upwards (skywards) and the front side of the plane substantially faces the ground. In some such embodiments, the antenna assembly is mounted so that the plane defined by the antenna is at least about 3 meters, at least about 4 meters and even at least about 5 meters above the ground, providing unobstructed line-of-sight to most transmission antenna of the entities without interference of trucks and other tall vehicles. In some such embodiments, such mounting allows a reduction of radiofrequency noise and interference received by the antenna assembly from the environment without compromising coverage of substantially the entire service station.

According to the teachings of the present invention there is also provided a method of establishing wireless communication in a service station, comprising: a) providing an antenna assembly as described above including at least two transmission antennae and at least two reception antennae b) providing a service station controller comprising a radio frequency transmitter functionally associated with the transmission antennae and a radio frequency receiver functionally associated with the reception antennae; c) providing at least one entity, such as a vehicle-mounted transmitter or a vehicle identification tag reader functionally associated with a fuel-dispensing location, each such entity comprising a dedicated transceiver and an antenna wherein the service station controller and the entities are configured for mutual two-directional communication using the service station controller transmitter and receiver and the entity transceivers, and where each transceiver is identifiable to the service station controller; d) the service station controller transmitting a signal to a specific entity using at least two transmission antennae of the antenna assembly (simultaneously or serially); e) subsequently to d, the service station controller listening for a response from the specific entity using at least one reception antenna of the antenna assembly; and f) subsequently to e, from amongst the reception antennae, selecting a single reception antenna for further communication between the service station controller and the specific entity.

In embodiments, a transmission antenna and a reception antenna of the antenna assembly are physically the same antenna. In embodiments, a transmission antenna and a reception antenna of the antenna assembly are physically different antennae.

In embodiments, an entity is a vehicle identification tag reader and the antenna of the vehicle identification tag reader is mounted on a fuel-dispensing nozzle of a fuel-dispensing location. In embodiments, such a vehicle identification tag reader is mounted on a fuel-dispensing nozzle of a fuel-dispensing location.

In embodiments, an entity is a vehicle-mounted transmitter, especially a vehicle mounted transceiver, especially with a self-contained power source.

In embodiments, the transmission antenna of entities that are vehicle-mounted transceivers are mounted in the vehicle so that the transmission antenna will substantially always have a significant component parallel to at least one of the reception antennae of the antenna assembly. For example, in embodiments, the transmission antennae of entities that are vehicle-mounted transmitters are oriented substantially in parallel with the ground (X-Z plane) so as to have little or no component perpendicular to the ground (Y-axis) and the orientations of two reception antennae of the antenna assembly define a plane that is substantially parallel with the ground (X-Z plane). For example, in embodiments, the transmission antennae of entities that are vehicle-mounted transceivers are oriented having a significant component substantially parallel with the Y-axis and the orientations of two reception antennae of the antenna assembly define a plane that is substantially perpendicular to the ground (X-Y or Y-Z planes).

In embodiments of the method of the present invention, the antenna assembly is mounted on a structure so that the back side of the plane defined by the orientation of the first and second antennae substantially faces the structure and the front side of the plane substantially faces a region where the fuel-dispensing locations are found.

In embodiments of the method of the present invention, the antenna assembly is mounted on a structure so that the plane defined by the orientation of the first and second antennae is substantially parallel to the ground (X-Z plane), the back side of the plane defined by the orientation of the first and second antennae substantially faces upwards (skywards) and the front side of the plane substantially faces the ground. In some such embodiments, the antenna assembly is mounted so that the plane defined by the antenna is at least about 3 meters, at least about 4 meters and even at least about 5 meters above the ground. In some such embodiments, such mounting allows a reduction of noise and interference received by the antenna assembly without compromising coverage of substantially the entire service station.

In embodiments, more than one reception antenna is used to listen (serially or simultaneously) for a transmission (e.g., a response) from the specific entity (such as vehicle mounted transceiver or vehicle identification tag reader), and the single reception antenna selected for further communication with the specific entity is the antenna determined as having best reception of signals transmitted from the specific entity.

In embodiments, the reception antennae are serially used to listen to a response from the specific entity (such as vehicle mounted transceiver or vehicle identification tag reader), and the single reception antenna selected for further communication with the specific entity is the first antenna determined as having sufficient reception of signals transmitted from the specific entity.

In embodiments of the method of the present invention, the receiver of the service station controller is configured to receive signals at least two different frequencies; and the listening for a response from the specific entity (such as vehicle mounted transceiver or vehicle identification tag reader) includes receiving signals at at least two different frequencies of the at least two different frequencies which the service station controller receiver is configured to receive; and wherein the selecting a single reception antenna includes selecting a reception frequency from amongst the at least two different frequencies.

In embodiments, more than one combination of reception antenna and frequency is used to listen for a response from the specific entity (such as vehicle mounted transceiver or vehicle identification tag reader) (serially or simultaneously), and the single reception antenna/frequency combination selected for further communication with the specific entity is the antenna and frequency combination determined as having best reception of signals transmitted from the specific entity.

In embodiments, reception antenna/frequency combinations are serially used to listen to a transmission (e.g., response) from the specific entity (such as vehicle mounted transceiver or vehicle identification tag reader), and the single reception antenna/frequency combination selected for further communication with the specific entity is the first combination determined as having sufficient reception of signals transmitted from the specific entity.

In embodiments, each transmission by an entity (such as vehicle mounted transceiver or vehicle identification tag reader) is preceded by an antenna selection transmission of a duration sufficient to allow the service station controller to select a single reception antenna (and frequency) for communication with the entity. For example, in embodiments, an entity precedes every transmission with a 0.1 millisecond antenna selection transmission that does not include important information. The service station controller has sufficient time to "scan" the reception antennae of the antenna assembly and the various available frequencies (that is, to test signal reception quality of the various antenna/frequency combinations) and select which are preferred before the entity transmits important information.

In embodiments, during communication with an entity the service station controller transmits through more than one antenna of the antenna assembly simultaneously but receives only on one antenna of the antenna assembly.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

As used herein, the terms "comprising" and "including" or grammatical variants thereof are to be taken as specifying the stated features, integers, steps or components but do not preclude the addition of one or more additional features, integers, steps, components or groups thereof. This term encompasses the terms "consisting of" and "consisting essentially of".

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF EMBODIMENTS

Figure 1:
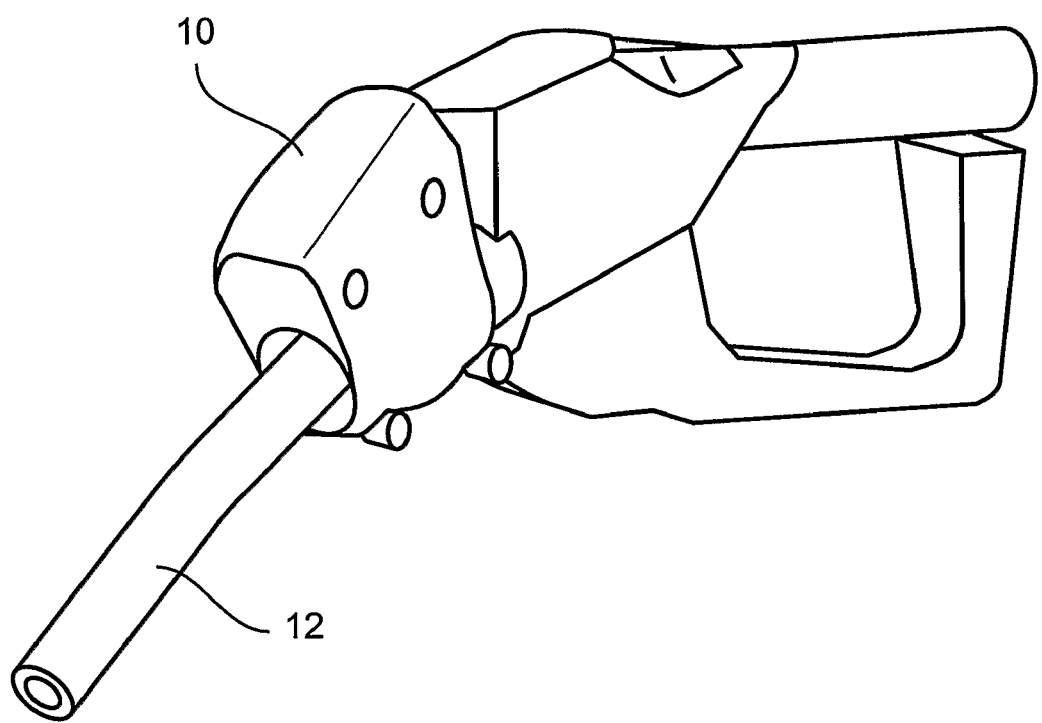
FIG. 1 (prior art) depicts a wireless tag reader secured to a fuel dispensing nozzle.

The present invention describes antenna assemblies useful for implementing wireless purchase authorization systems in service stations. The present invention also describes service stations equipped with antenna assemblies. The present invention also describes methods for establishing wireless communication between a service station controller and an entity such as a vehicle-mounted transmitter or a vehicle identification tag reader functionally associated with a fuel-dispensing location. Embodiments of the present invention allow significant savings by allowing the entity to save energy during transmission to the service station controller. The savings of energy are such that there is a significant reduction of operation costs of a service station including wireless transmitters provided with autonomous power supplies are reduced, for example allowing smaller and cheaper power supplies or reducing the frequency of maintenance. In some embodiments, the reduction of operation costs is so significant that implementing such service stations becomes practical.

The principles and operation of an antenna assembly, of a service station of the present invention and of the method of the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

As noted in the introduction above, it is desirable to provide robust wireless communication between an entity such as a vehicle-mounted transmitter or a vehicle identification tag reader mounted on a fuel dispensing nozzle and a service station controller. For example, it has been found that due to the fact that the tag reader is mounted on the fuel dispensing nozzle, the orientation of the antenna of the tag reader transmitter relative to the antenna of the receiver of the service station controller changes dramatically during ordinary use of the fuel dispensing nozzle. For example, it has been found that due to the fact that the vehicle-mounted transmitter is mounted on a vehicle, the orientation of the antenna of the transmitter relative to the antenna of the receiver of the service station controller changes as each vehicle enters a service station in a different orientation.

As a result, there is a transmission/reception antenna orientation mismatch which leads to non-robust radio communication, especially at the commercially relevant frequencies (VHF and UHF). At the same time, it is often desired that a vehicle identification tag reader or a vehicle-mounted transmitter be small and light (so as not to interfere with the operation, for example of a fuel dispensing nozzle on which mounted or to interfere with vehicle operation), cheap, reliable and that the entity include a long-lived integral power supply which requires that the entity be energy efficient. The constraints imposed by these desires preclude known solutions for overcoming antenna orientation mismatch.

An aspect of the present invention is of antenna assemblies suitable for use in wireless radio frequency communications that, in embodiments, meets at least some of the challenges discussed above.

Generally, an antenna assembly of the present invention comprises a first linearly polarized antenna and a second linearly polarized antenna, positioned so that the orientation of the second antenna is at an angle relative to the orientation of the first antenna so as to define a plane having a front side and a back side wherein the first antenna and the second antenna are configured to function as reception antennae.

In embodiments, an antenna assembly of the present invention comprises a radio frequency receiver (such as the receiver function of a radio frequency transceiver) functionally associated with the first antenna and the second antenna as reception antennae. In embodiments, an antenna assembly of the present invention does not comprise a radio frequency receiver but is configured to allow functional association of the first and second antennae with a radio frequency receiver (such as the receiver function of a radio frequency transceiver) which is not necessarily a component of the antenna assembly.

It is important to note that in an antenna assembly of the present invention the first antenna and the second antenna generally do not constitute an antenna array, that is an assembly where the antennae function together to provide a single reception antenna having a different reception pattern than each separately. Rather, in embodiments of an antenna assembly of the present invention the first antenna is configured to function as a reception antenna substantially independently from the second antenna.

In embodiments of an antenna assembly of the present invention, the first antenna and second antenna are configured to function as transmission antennae in addition to being configured to function as reception antennae as discussed above. In such embodiments it is preferred that the angle between the orientation of the first antenna and the orientation of the second antenna is approximately 90° so that there be minimal or substantially no interaction between the antennae during simultaneous transmission.

In embodiments, an antenna assembly of the present invention comprises a radio frequency transmitter (such as a transmitter function of a radio frequency transceiver) functionally associated with the first antenna and the second antenna as transmission antennae. In embodiments, an antenna assembly of the present invention does not comprise a radio frequency transmitter but is configured to allow functional association of the first and second antennae with a radio frequency transmitter (such as a transmitter function of a radio frequency transceiver) which is not necessarily a component of the antenna assembly.

It is important to note that in an antenna assembly of the present invention the first antenna and the second antenna generally do not constitute an antenna array, that is an assembly where the antennae function together to produce a different radiation pattern when transmitting than each separately. Rather, in embodiments of an antenna assembly of the present invention the first antenna is configured to function as a transmission antenna substantially independently from the second antenna.

In embodiments, an antenna assembly of the present invention comprises a third linearly polarized antenna and a fourth linearly polarized antenna, positioned so that the orientation of the fourth antenna is at an angle relative to the orientation of the third antenna so as to define a plane having a front side and a back side wherein the third antenna and the fourth antenna are configured to function as transmission antennae.

In embodiments, the plane defined by the orientation of the third and fourth antennae is substantially parallel to or includes the plane defined by the orientation of the first and second antennae.

In embodiments, an antenna assembly of the present invention comprises a radio frequency transmitter (such as a transmitter function of a radio frequency transceiver) functionally associated with the third antenna and the fourth antenna as transmission antennae. In embodiments, an antenna assembly of the present invention does not comprise a radio frequency transmitter but is configured to allow functional association of the third and fourth antennae with a radio frequency transmitter (such as a transmitter function of a radio frequency transceiver) which is not a component of the antenna assembly.

It is important to note that in an antenna assembly of the present invention the third antenna and the fourth antenna generally do not constitute an antenna array, that is an assembly where the antennae function together to produce a substantially different radiation pattern than each separately. Rather, in embodiments of an antenna assembly of the present invention the third antenna is configured to function as a transmission antenna substantially independently from the fourth antenna. In such embodiments it is preferred that the angle between the orientation of the third antenna and the orientation of the fourth antenna is approximately 90° so that there be minimal or substantially no interaction between the antennae during simultaneous transmission.

In embodiments, an antenna assembly of the present invention further comprises a fifth linearly polarized antenna, positioned so that the orientation of the fifth antenna is not-coplanar with the plane defined by the first and second antennae, the fifth antenna configured to function as a reception antenna. In embodiments, such a fifth antenna protrudes out on the front side of the plane defined by the first and second antennae.

In embodiments, an antenna assembly of the present invention comprises a radio frequency receiver (such as a receiver function of a radio frequency transceiver) functionally associated with the first antenna, the second antenna and the fifth antenna as reception antennae. In embodiments, an antenna assembly of the present invention does not comprise a radio frequency receiver but is configured to allow functional association of the first, second and fifth antennae with a radio frequency receiver (such as a receiver function of a radio frequency transceiver) which is not necessarily a component of the antenna assembly.

It is important to note that in an antenna assembly of the present invention the first antenna, the second antenna and a fifth antenna generally do not constitute an antenna array, that is an assembly where the antennae function together to provide a single reception antenna having a different reception pattern than each separately. Rather, in embodiments of an antenna assembly of the present invention the fifth antenna is configured to function as a reception antenna substantially independently from the first antenna and the second antenna.

In embodiments (particularly where the first antenna and second antenna are also configured as transmission antennae), the fifth second antenna is configured to function as a transmission antenna in addition to being configured to function as a reception antenna as discussed above. In such embodiments it is preferred that the orientation of the first antenna, the orientation of the second antenna and the orientation of the fifth antenna be substantially orthogonal so that there be minimal or substantially no interaction between the antennae during simultaneous transmission.

In embodiments, an antenna assembly of the present invention comprises a radio frequency transmitter (such as a transmitter function of a radio frequency transceiver) functionally associated with the fifth antenna (and generally also the first antenna and the second antenna) as a transmission antennae. In embodiments, an antenna assembly of the present invention does not comprise a radio frequency transmitter but is configured to allow functional association of the fifth antenna (and generally also the first and second antennae) with a radio frequency transmitter (such as a transmitter function of a radio frequency transceiver) which is not necessarily a component of the antenna assembly. It is important to note that in an antenna assembly of the present invention the first antenna, the second antenna and the fifth antenna generally do not constitute an antenna array, that is an assembly where the antennae function together to produce a different radiation pattern than each separately. Rather, in embodiments of an antenna assembly of the present invention the fifth antenna is configured to function as a transmission antenna substantially independently from the first antenna and the second antenna.

It is important to note that for clarity, a reception antenna in addition to the first antenna and the second antenna has been termed "fifth antenna" to differentiate between an additional reception antenna and two transmission antennae designated herein as third antenna and fourth antenna. In embodiments, an antenna assembly of the present invention includes only three reception antennae, referred to herein as a first antenna, a second antenna and a fifth antenna. In embodiments, an antenna assembly of the present invention includes three dual-function reception/transmission antennae, referred to herein as a first antenna, a second antenna and a fifth antenna.

In embodiments, an antenna assembly of the present invention further comprises a sixth linearly polarized antenna, positioned so that the orientation of the sixth antenna is substantially not-coplanar with the plane defined by the third and fourth antennae, the sixth antenna configured to function as a transmission antenna. In embodiments, such a sixth antenna protrudes out on the front side of the plane defined by the third and fourth antennae. In such embodiments it is preferred that the orientation of the third antenna, the orientation of the fourth antenna and the orientation of the sixth antenna be substantially orthogonal so that there be minimal or substantially no interaction between the antennae during simultaneous transmission.

In embodiments, an antenna assembly of the present invention comprises a radio frequency transmitter (such as a transmitter function of a radio frequency transceiver) functionally associated with the sixth antenna (and generally also the third antenna and the fourth antenna) as a transmission antenna. In embodiments, an antenna assembly of the present invention does not comprise a radio frequency transmitter but is configured to allow functional association of the sixth antenna (and generally also the third and fourth antennae) with a radio frequency transmitter (such as a transmitter function of a radio frequency transceiver) which is not necessarily a component of the antenna assembly. It is important to note that in an antenna assembly of the present invention the third antenna, the fourth antenna and the sixth antenna generally do not constitute an antenna array, that is an assembly where the antennae function together to produce a different radiation pattern than each separately. Rather, in embodiments of an antenna assembly of the present invention the sixth antenna is configured to function as a transmission antenna substantially independently from the third antenna and the fourth antenna.

One of ordinary skill in the art is able to configure an antenna (e.g., a first antenna, a second antenna and/or a fifth antenna) of an antenna assembly of the present invention to function as a radio frequency reception antenna, including selecting, in accordance with the frequency or frequencies to be received, the size, shape, materials of the antenna as well as selecting and associating in the proper way the necessary electronic components and physical components, such as circuitry, filters, jacks, inputs, outputs and connectors.

One of ordinary skill in the art is able to configure an antenna (e.g., a third antenna, a fourth antenna and/or a sixth antenna) of an antenna assembly of the present invention to function as a radio frequency transmission antenna, including selecting, in accordance with the frequency or frequencies to be transmitted, the size, shape, materials of the antenna as well as selecting and associating in the proper way the necessary electronic components and physical components, such as circuitry, filters, jacks, inputs, outputs and connectors.

One of ordinary skill in the art is able to configure an antenna (e.g., a first antenna, a second antenna and/or a fifth antenna) of an antenna assembly of the present invention to function as a radio frequency reception/transmission antenna, including selecting, in accordance with the frequency or frequencies to be received and transmitted, the size, shape, materials of the antenna as well as selecting and associating in the proper way the necessary electronic components and physical components, such as circuitry, filters, jacks, inputs, outputs and connectors.

Figure 2A:
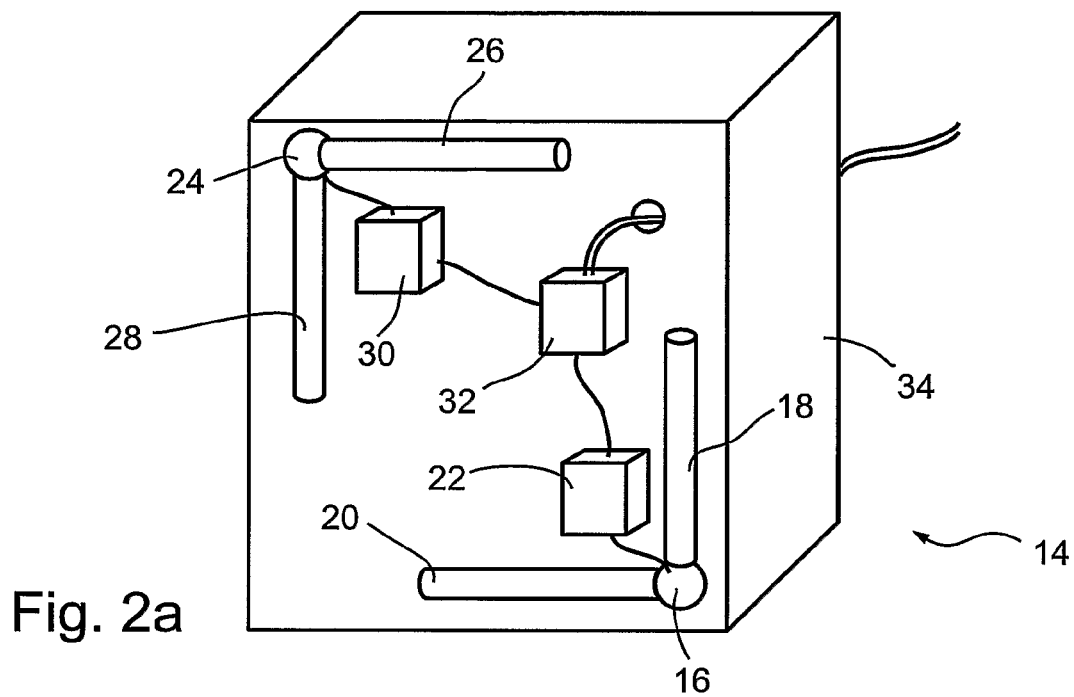
FIG. 2A depicts an antenna assembly of the present invention including two transmission antennae and two reception antennae.

A first embodiment of an antenna assembly of the present invention, antenna assembly 14 is schematically depicted in FIG. 2A.

Antenna assembly 14 includes a reception antenna holder 16 to which are attached a vertically oriented first reception antenna 18 and a horizontally oriented second reception antenna 20. Reception antenna holder 16 holds first reception antenna 18 at a 90° angle from second reception antenna 20, so that antennae 18 and 20 define a plane. As both first antenna 18 and second antenna 20 are simple linearly polarized omnidirectional rod antenna, the orientations of the antennae define a plane that is substantially coplanar with the plane defined by the physical antennae. Functionally associated with first antenna 18 is a radio frequency receiver 22 so that receiver 22 is able to receive radio frequency signals through first antenna 18. Independently of the association with first antenna 18, receiver 22 is also functionally associated with second antenna 20 so that receiver 22 is able to receive radio frequency signals through second antenna 20. Receiver 22 is configured to either receive signals through first antenna 18 and second antenna 20 simultaneously or to receive signals through either first antenna 18 or second antenna 20 not-simultaneously.

Antenna assembly 14 also includes a transmission antenna holder 24 to which are attached a vertically oriented third transmission antenna 28 and a horizontally oriented fourth transmission antenna 26. Transmission antenna holder 24 holds third transmission antenna 28 at a 90° angle from fourth transmission antenna 26, so that antennae 26 and 28 define a plane. As both third antenna 28 and fourth antenna 26 are simple linearly polarized omnidirectional rod antenna, the orientation of the antennae define a plane that is substantially coplanar with the plane defined by the physical antennae (and in antenna assembly 14, substantially coplanar with the plane defined by the orientation of first antenna 16 and second antenna 18). Functionally associated with third antenna 28 is a radio frequency transmitter 30 so that transmitter 30 is able to transmit radio frequency signals using third antenna 28. Independently of the association with third antenna 28, transmitter 30 is also functionally associated with fourth antenna 26 so that transmitter 30 is able to transmit radio frequency signals using fourth antenna 26. Transmitter 30 is configured to either transmit signals separately using third antenna 28 and fourth antenna 26 simultaneously or to transmit signals with either third antenna 28 or fourth antenna 26 not simultaneously.

Receiver 22 and transmitter 30 are both functionally associated with a controller/adaptor 32 which is configured to interface with other devices, to receive power, to receive signals which are to be transmitted by transmitter 30 from other devices and to forward signals which are received by receiver 22 to other devices, for example signals to and from a service station controller. All the components above are held within casing 34.

Figure 2B:
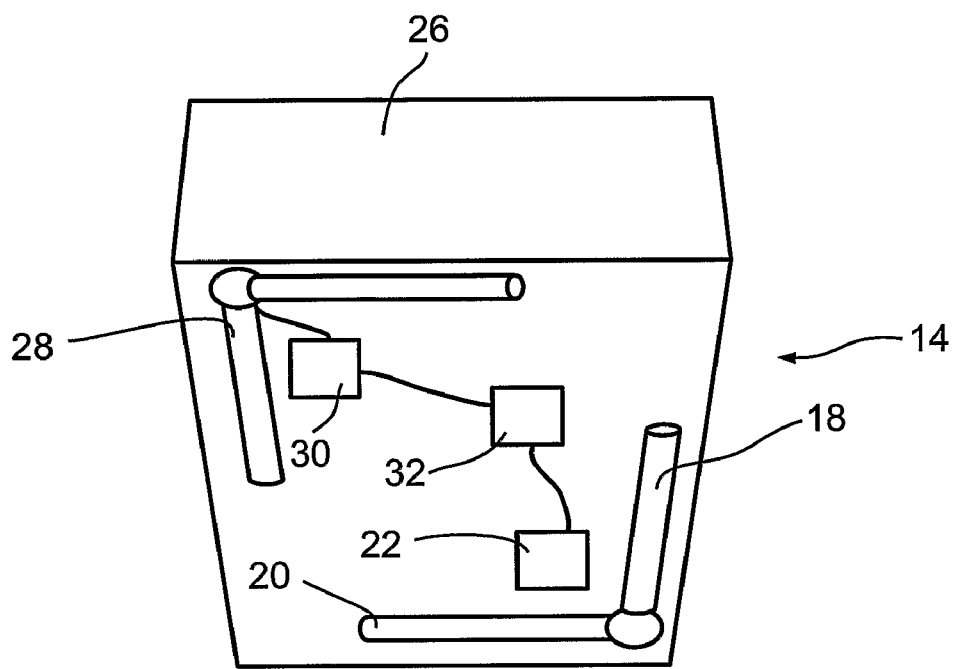
FIG. 2B depicts an antenna assembly of FIG. 2A receiving radio frequency signals from three different transmitters.
Figure 2B:
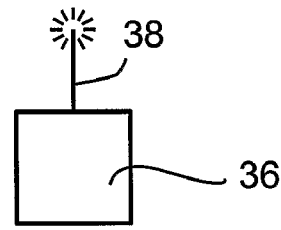
Figure 2B:
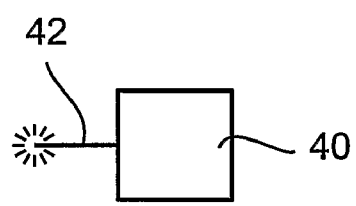
Figure 2B:
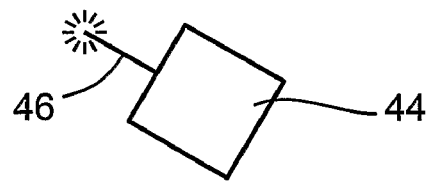

The operation of antenna assembly 14 is schematically depicted in FIG. 2B with regards to reception of radio frequency signals from a transmitter 36 with a vertically oriented whip (thus linearly polarized omnidirectional) antenna 38, a transmitter 40 with a horizontally oriented whip antenna 42 and a transmitter 44 with a whip antenna 46 oriented at 45° from vertical.

Antenna 38 of transmitter 36 is oriented in parallel (angle of)0° to first antenna 18 of antenna assembly 14. As coupling of two linearly polarized antennae is a function of the cosine of the angle between the orientations of the transmitting and receiving antennae, there is no mismatch and no coupling loss between antenna 38 of transmitter 36 and first antenna 18 of antenna assembly 14 and coupling is maximal (Cos(0)=1). First antenna 18 is ideally oriented to receive signals from antenna 38. In contrast, antenna 38 of transmitter 36 is oriented perpendicularly (angle of)90° to second antenna 18 of antenna assembly 14. Therefore, there is complete mismatch and total coupling loss between antenna 38 of transmitter 36 and second antenna 18 of antenna assembly 14 and coupling is minimal (Cos(90)=0). Second antenna 20 receives no signal from antenna 38.

Antenna 42 of transmitter 40 is oriented in parallel (angle of)0° to second antenna 20 of antenna assembly 14. Therefore, there is no orientation mismatch and no coupling loss between antenna 42 of transmitter 40 and second antenna 20 of antenna assembly 14 and coupling is maximal (Cos(0)=1). Second antenna 20 is ideally oriented to receive signals from antenna 38. In contrast, antenna 38 of transmitter 36 is oriented perpendicularly (angle of)90° to first antenna 18 of antenna assembly 14. Therefore, there is complete mismatch and total coupling loss between antenna 38 of transmitter 36 and first antenna 18 of antenna assembly 14 and coupling is minimal (Cos(90)=0). First antenna 18 receives no signal from antenna 38.

Antenna 46 of transmitter 44 is oriented at a 45° angle relative to first antenna 18 and second antenna 20 of antenna assembly 14. As Cos(45)=0.707, there is a mild orientation mismatch and about 30% coupling loss between antenna 46 of transmitter 44 and both first antenna 18 and second antenna 20 of antenna assembly 14. Both first antenna 18 and second antenna 20 receive a reasonable signal from antenna 46.

Thus, as is clear to one of average skill in the art, an antenna assembly of the present invention is able to receive reasonable strength signals with, in the worst case, only moderate coupling loss and is therefore suitable for use in receiving signals from transmitters having randomly oriented transmission antennas.

Analogously to the above, in the case of transmission, transmitter 30 transmits signals through either third antenna 28 or fourth antenna 26. Whatever the relative orientation of an antenna of a receiver to which transmission of the signal is intended, transmission from either or both third antenna 28 and fourth antenna 26 will have only a mild orientation mismatch and no more than about 30% coupling loss.

Thus, as is clear to one of average skill in the art, an antenna assembly of the present invention is able to transmit signals to receivers having randomly oriented reception antennae with, in the worst case, only moderate coupling loss.

Antenna assembly 14 is suitable for use in reception of radio signals having a significant component in the plane defined by the orientation of first antenna 18 and second antenna 20. In certain implementations, it may also be necessary to receive signals having only a small component or even substantially perpendicular to the plane. Antenna assembly 14 is also suitable for use in transmission of radio signals to linearly polarized antenna having a significant component in the plane defined by the orientation of third antenna 28 and fourth antenna 26. In certain implementations, it may also be necessary to transmit signals to linearly polarized antenna having only a small component or that are even substantially perpendicular to the plane.

Figure 3:
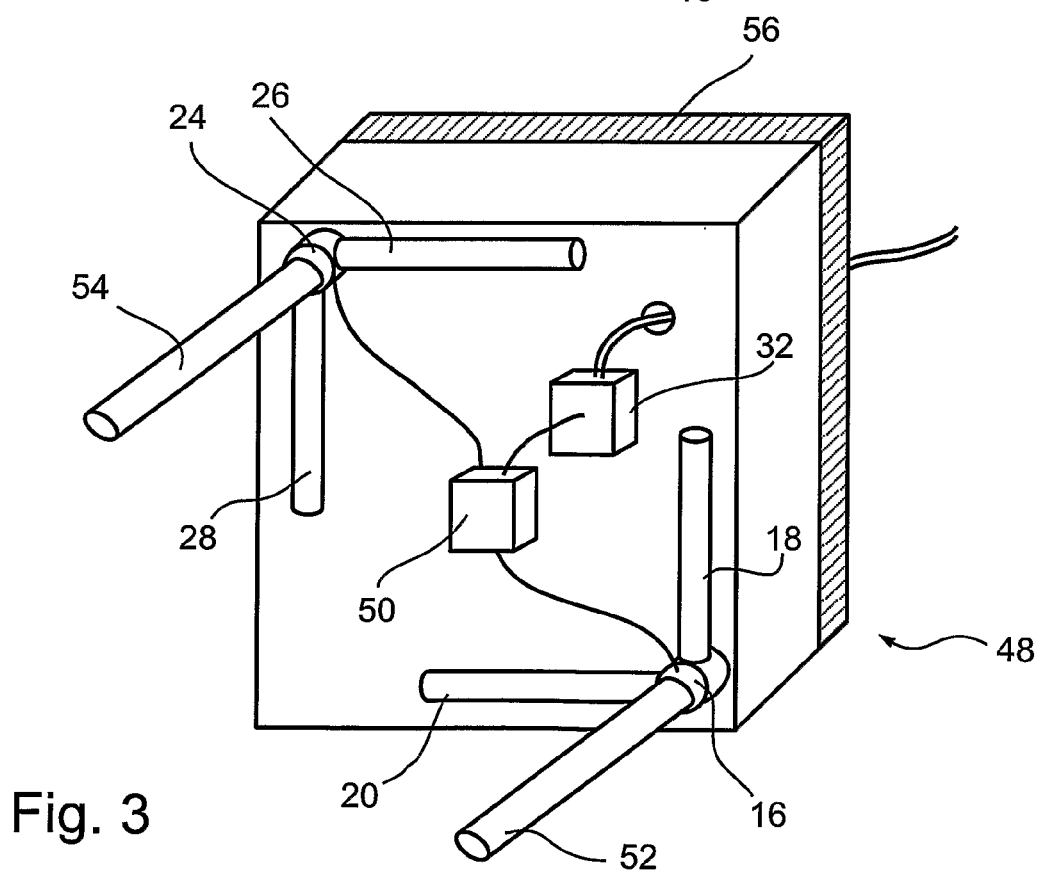
FIG. 3 depicts an antenna assembly of the present invention including three transmission antennae and three reception antennae.

In FIG. 3 is depicted a second embodiment of an antenna assembly of the present invention, antenna assembly 48.

Antenna assembly 48 of the present invention is substantially similar to antenna assembly 14. Unlike antenna assembly 14 that comprises receiver 22 separate from transmitter 30, antenna assembly 48 comprises a transceiver 50 where the receiver function of transceiver 50 is functionally associated with a first antenna 18 and a second antenna 20 and the transmitter function of transceiver 50 is functionally associated with a third antenna 28 and a fourth antenna 26.

A significant difference between antenna assembly 48 and antenna assembly 14 is that antenna assembly 48 comprises a fifth reception antenna 52 functionally associated with the receiver function of transceiver 50 independently of first antenna 18 and second antenna 20. Fifth antenna 52 is oriented at 90° relative to both first antenna 18 and second antenna 20 so therefore protrudes from and is necessarily substantially not-coplanar with the plane defined by the orientation of first antenna 18 and second antenna 20.

An additional significant difference between antenna assembly 48 and antenna assembly 14 is that antenna assembly 48 comprises a sixth transmission antenna 54 functionally associated with the transmitter function of transceiver 50 independently of third antenna 28 and fourth antenna 26. Sixth antenna 54 is oriented at 90° relative to both third antenna 28 and fourth antenna 26 so therefore protrudes from and is necessarily substantially not-coplanar with the plane defined by the orientation of third antenna 28 and fourth antenna 26.

Antenna assembly 48 functions substantially analogously to antenna assembly 14 for both transmission and reception of radio frequency signals. However, as is clear to one skilled in the art, the presence of fifth antenna 52 allows antenna assembly 48 to receive signals from transmitters having antennae that are oriented perpendicularly or nearly perpendicularly to the plane defined by the orientation of first antenna 18 and second antenna 20 with, in the worst case, only moderate coupling loss. Similarly, the presence of sixth antenna 54 allows antenna assembly 48 to transmit signals to receivers having antennae that are oriented perpendicularly or nearly perpendicularly to the plane defined by the orientation of third antenna 28 and fourth antenna 26 with, in the worst case, only moderate coupling loss.

Antenna assembly 48 also comprises a radio frequency reflector 56 (a plate or screen of suitable material) configured to reflect radio frequency radiation to the front side of the plane defined by the orientation of first antenna 18 and the orientation of second antenna 20 by being positioned behind the plane. In such a way, the azimuth of reception of antenna assembly 48 is limited to substantially only the front side of the plane defined by the orientation of first antenna 18 and the orientation of second antenna 20 but the gain from the front side for both signal transmission and reflection is significantly increased.

Figure 4:
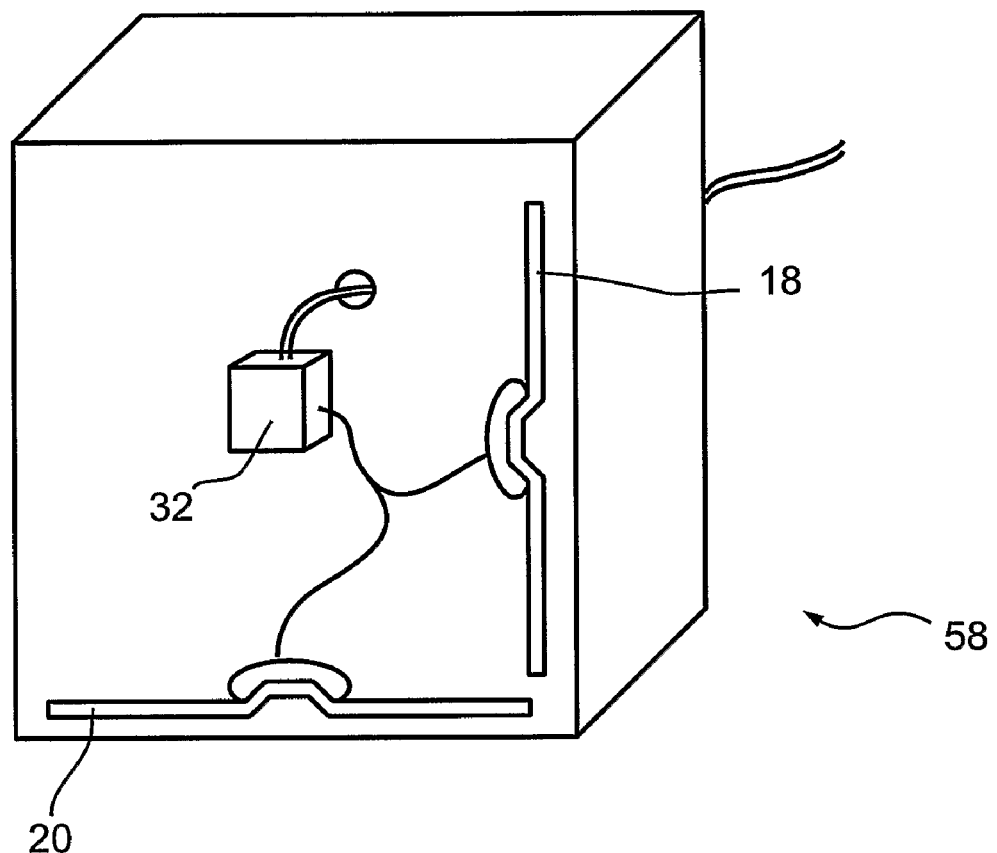
FIG. 4 depicts an antenna assembly of the present invention including two antennae, each serving as a transmission and as a reception antenna.

In FIG. 4 is depicted a third embodiment of an antenna assembly of the present invention, antenna assembly 58.

Antenna assembly 58 of the present invention is substantially similar to antenna assembly 14. Unlike antenna assembly 14 that comprises a receiver 22 and a transmitter 30, antenna assembly 58 does not comprise a receiver or a transmitter, but rather only includes a controller/adaptor 32 which is configured to interface with other devices, to receive power, to receive signals which are to be transmitted from other devices and to forward signals which are received by to other devices, for example signals to and from a transceiver of a service station controller.

A significant difference between antenna assembly 58 and antenna assembly 14 is that antenna assembly does not comprise dedicated transmission antennae such as third antenna 28 and fourth antenna 26 of antenna assembly 14. Rather antenna assembly 58 comprises a first antenna 18 (a vertically-oriented linearly polarized omnidirectional dipole antenna) and a second antenna 20 (a horizontally-oriented linearly polarized omnidirectional dipole antenna), both configured to function as transmission antennae and as reception antennae.

In the embodiments described above the angle between the orientation of a first antenna and the orientation of a second antenna is 90°. As is clear to one skilled in the art, a 90° orientation provides the lowest average orientation mismatch with randomly-oriented transmitting antennas. That said, in embodiments, the angle between orientation of a first antenna and a second antenna of an antenna assembly of the present invention is less than 90°. In embodiments, the angle is not less than about 75°, not less than about 60° and even not less than about 45°.

In the embodiments described above the angle between the orientation of a fifth antenna and the orientation of a first antenna or a second antenna is 90°. In embodiments, the angle between orientation of a fifth antenna and a first antenna and/or a second antenna of an antenna assembly of the present invention is less than 90°. In embodiments, the angle is not less than about 75°, not less than about 60° and even not less than about 45°.

In the embodiments described above the angle between the orientation of a third antenna and the orientation of a fourth antenna is 90°. In embodiments, the angle between orientation of a third antenna and a fourth antenna of an antenna assembly of the present invention is less than 90°. In embodiments, the angle is not less than about 75°, not less than about 60° and even not less than about 45°.

In the embodiments described above the angle between the orientation of a sixth antenna and the orientation of a fourth antenna or a fifth antenna is 90°. In embodiments, the angle between orientation of a sixth antenna and a third antenna and/or a fourth antenna of an antenna assembly of the present invention is less than 90°. In embodiments, the angle is not less than about 75°, not less than about 60° and even not less than about 45°.

As note above, it is preferred that the orientation of any two transmission antennae be substantially orthogonal so that there be minimal or substantially no interaction between the antennae during simultaneous transmission.

One skilled in the art, upon perusal of the description herein, is able to select suitable types of antennae for implementing the teachings of the present invention. Generally, it is preferred that suitable antenna for implementing the first, second, third, fourth, fifth and/or sixth antennae) are omnidirectional antennae. Suitable antennae (for implementing the first, second, third, fourth, fifth and/or sixth antennae) include, but are not limited to, monopole, simple rod, whip, dipole, folded dipole, half wave, J-Pole, loop, large loop, and microstrip antennae.

An aspect of the present invention is a service station provided with a wireless communication system, comprising: a) a service station controller comprising a radio frequency receiver functionally associated with an antenna assembly as described above; b) at least one entity comprising a transmitter and an antenna, wherein the service station controller receiver and the antenna assembly are configured for reception of signals transmitted by the entity transmitter. In embodiments, at least one entity comprises a vehicle-mounted transmitter, e.g. a second identification tag as described in the PCT patent applications published as WO 2007/049273 and WO 2007/049274. In embodiments, at least one entity comprises a vehicle identification tag reader, each vehicle identification tag reader functionally associated with a fuel-dispensing location and comprising a dedicated transmitter and an antenna.

Figure 5:
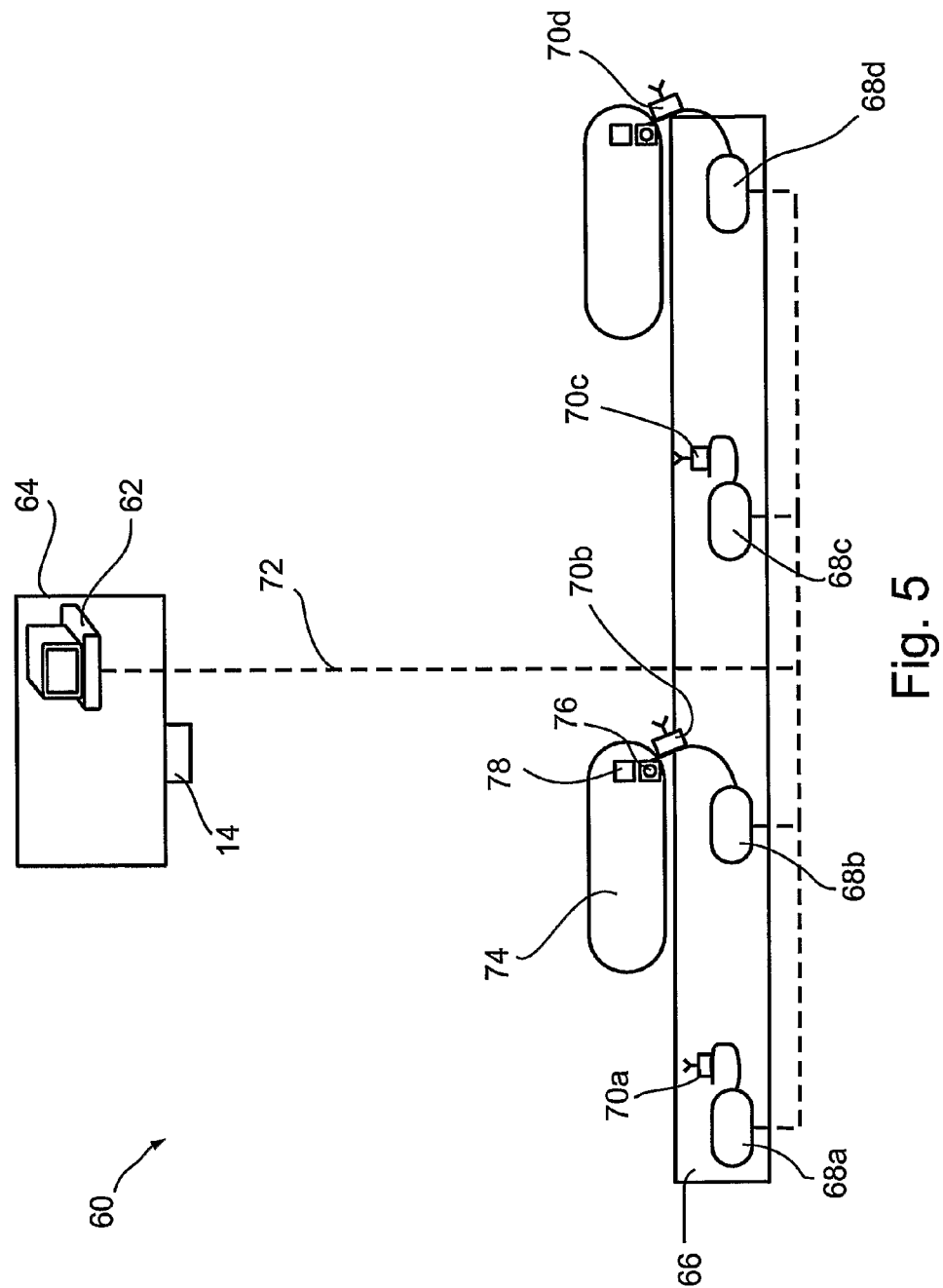
FIG. 5 depicts an embodiment of a service station of the present invention including an antenna assembly oriented so the plane defined by two antennae is substantially perpendicular to the ground (X-Y plane)

An embodiment of a service station of the present invention, service station 60 is depicted in FIG. 5. Service station 60 includes a service station controller 62 inside a service station building 64 that is functionally associated with an antenna assembly 14. Antenna assembly 14 is mounted on a wall of service station building 64 facing refueling pier 66 so that that the back side of the plane defined by the orientations of first antenna 18 and second antenna 20 faces the wall and the front side of the plane substantially faces refueling pier 66.

Secured to the fuel dispensing nozzles of the fuel-dispensing locations 68a, 68b, 68c and 68d on refueling pier 66 are wireless vehicle identification tag readers 70a, 70b, 70c and 70d, similar to the tag readers described in the PCT patent applications published as WO 2007/049273 and WO 2007/049274 of the Applicant and depicted in FIG. 1.

Tag readers 70a, 70b, 70c and 70d all comprise dedicated wireless transceivers and an associated antenna that are entities configured for two-way wireless communication with service station controller 62 through antenna assembly 14.

Service station controller 62 is in wired communication with fuel dispensing locations 68a, 68b, 68c and 68d through communication channel 72 in the usual way.

For refueling, a vehicle 74 parks near a fuel dispensing location 68b and places the respective fuel-dispensing nozzle in the refueling port 76, bringing the associated tag reader 70b in reading proximity of vehicle identification tag 78. Tag reader 70b communicates the information read from tag 78 to service station controller 62. Based on the read information, service station controller 62 optionally issues an authorization signal to fuel dispensing location 68b which then allows fuel to be dispensed to vehicle 74. As communication between tag reader 76 and service station controller 62 is through antenna assembly 14, communication is robust and the variation of orientations that tag reader 76 (and the associated antenna) may adopt does not adversely influence the communication.

Any suitable method of establishing and maintaining wireless communication may be used in a service station such as service station 60. That said, an aspect of the present invention implementable using, for example, a service station such as 60 is also of a method of establishing wireless communication in a service station such as service station 60.

In a first step, service station controller 62 transmits (simultaneously or serially) a signal to specific tag reader (e.g., 70b) using at least two antennae, i.e. third antenna 28 and fourth antenna 26.

Service station controller 62 then listens to a response from the specific tag reader 70b monitoring (simultaneously or serially) signals received through at least two antennae, i.e., first antenna 18 and second antenna 20.

Upon receipt of a response signal, service station controller 62 selects a single reception antenna (i.e., either first antenna 18 or second antenna 20) for further communication with the specific tag reader 70b. Generally, but not necessarily, service station controller 62 also selects a single transmission antenna (i.e., either third antenna 28 or fourth antenna 26) for further communication with the specific tag reader 70b.

In embodiments, the reception antenna selected is the antenna with the orientation that is determined to provide the best reception of signals from the specific tag reader 70.

In embodiments, the reception antenna selected is the first antenna determined to provide a sufficient reception of signals from the specific tag reader 70. Such an embodiment is usually an embodiment where listening for a response from the specific tag reader by the different reception antennae is performed serially.

In embodiments, the receiver of a service station controller is configured to receive signals at least two different frequencies and the listening for a response form the specific tag reader includes receiving signals at least two different frequencies of the at least two different frequencies which the service station controller receiver is configured to receive (simultaneously or serially). In such embodiments, in addition to selecting a reception antenna selected for further communication with the specific tag reader a reception frequency is selected from amongst the frequencies available. In embodiments the reception antenna/reception frequency combination selected for further communication is the combination having the best reception of signals transmitted from the specific tag reader. In embodiments the reception antenna/reception frequency combination selected for further communication is the first combination determined to have sufficient reception of signals transmitted from the specific vehicle identification tag reader.

In embodiments, each transmission by an entity (such as vehicle mounted transceiver or vehicle identification tag reader) is preceded by an antenna selection transmission of a duration sufficient to allow the service station controller to select a single reception antenna (and frequency) for communication with the entity, as described above. For example, in embodiments, an entity precedes every transmission with a 0.1 millisecond antenna selection transmission that does not include important information. The service station controller has sufficient time to "scan" the reception antennae of the antenna assembly and the various available frequencies and select which are preferred before the entity transmits important information.

In embodiments, for example such embodiments where the entity transmits an antenna selection transmission as described above, the service station controller simultaneously transmits through more than one antenna of the antenna assembly but receives only on one antenna of the antenna assembly, selected as described above.

In embodiments of the present invention, an entity configured to communicate with a service station controller is a vehicle-mounted transmitter, especially a vehicle mounted transmitter with a self-contained power source such as a second vehicle identification tag described in the PCT patent applications published as WO 2007/049273 and WO 2007/049274 of the Applicant. In such embodiments, the communication challenges are similar to the challenges when the entity configured to communicate with the service station controller is a vehicle identification tag reader but include an additional challenge: mounting of the vehicle mounted transmitter which may lead to variability in the orientation of the transmission antenna. If the person mounting the transmitter has an unlimited amount of time and all vehicles have a single preferable place for mounting a vehicle mounted transmitter, the person may be instructed to mount the vehicle-mounted transmitter so that the antenna is of a specific orientation. However, due to variability between vehicles and the limited time available for mounting the transmitter it is challenging to ensure that all transmitters are indeed mounted correctly.

One solution is to provide an antenna assembly having three reception antennae, such as antenna assembly 48 depicted in FIG. 3.

Alternatively, the transmitting entity is mounted in a vehicle so that the transmission antenna will substantially always have a significant component parallel to at least one of the reception antennae of the antenna assembly. For example, in embodiments, the transmission antennae of entities that are vehicle-mounted transmitters are oriented substantially in parallel with the ground (X-Z plane) so as to have little or no component perpendicular to the ground (Y-axis) and the orientations of two reception antennae of the antenna assembly define a plane that is substantially parallel with the ground (X-Z plane). For example, in embodiments, the transmission antennae of entities that are vehicle-mounted transmitters are oriented having a significant component substantially parallel with the Y-axis and the orientations of two reception antennae of the antenna assembly define a plane that is substantially perpendicular with the ground (X-Y or Y-Z planes).

Figure 6:
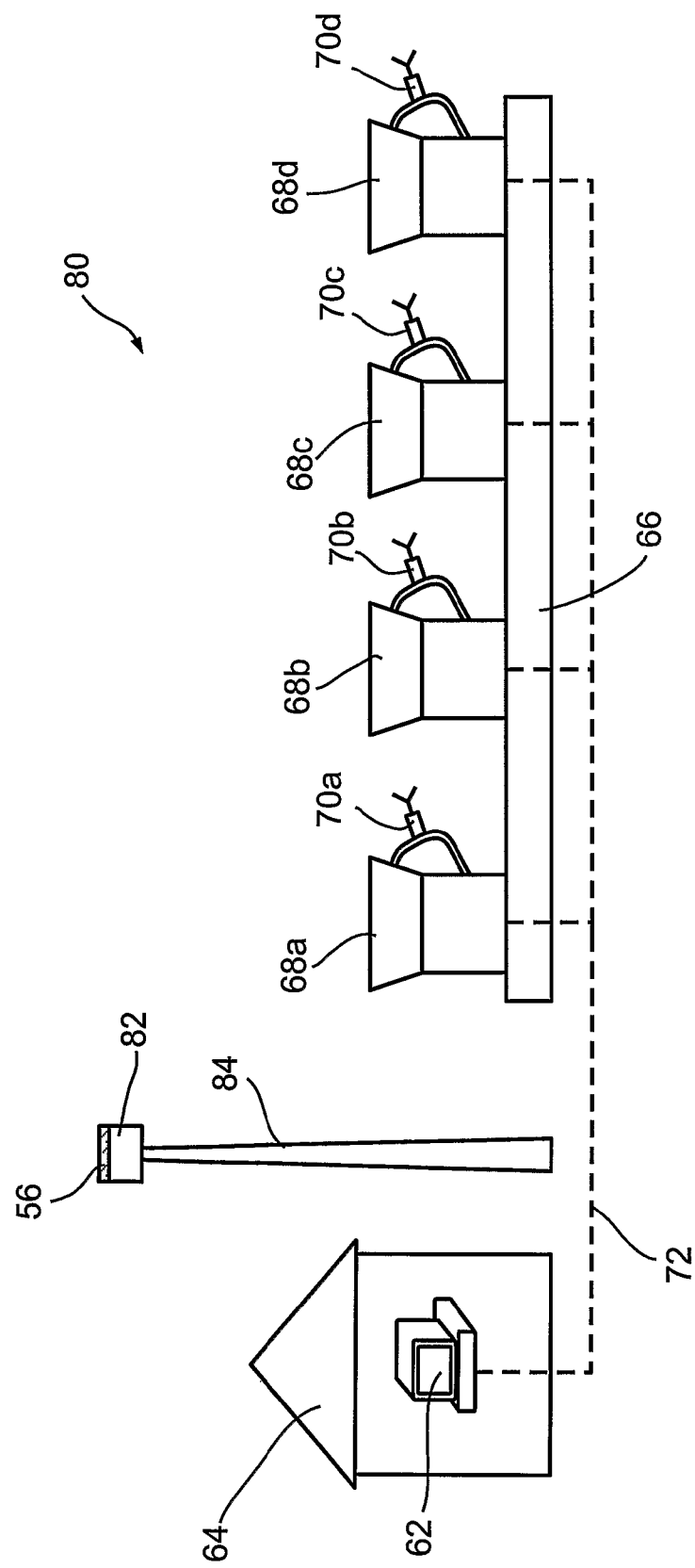
FIG. 6 depicts an embodiment of a service station of the present invention including an antenna assembly oriented so the plane defined by two antennae is substantially parallel to the ground (X-Z plane).

An additional embodiment of a service station of the present invention, service station 80 is schematically depicted in FIG. 6. Service station 80 is substantially similar to service station 60 discussed hereinabove and includes a service station controller a service station building 64 that is functionally associated with an antenna assembly 82. Secured to the fuel dispensing nozzles of the fuel-dispensing locations 68a, 68b, 68c and 68d on refueling pier 66 are wireless vehicle identification tag readers 70a, 70b, 70c and 70d. Tag readers 70a, 70b, 70c and 70d all comprise dedicated wireless transceivers and an associated antenna that are entities configured for two-way wireless communication with service station controller 62 through antenna assembly 82. Service station controller 62 is in wired communication with fuel dispensing locations 68a, 68b, 68c and 68d through communication channel 72 in the usual way.

A significant difference between service station 60 and service station 80 is antenna assembly 82. Antenna assembly 82 is substantially similar to antenna assembly 14 but includes a radiofrequency reflector 56 that limits the azimuth of reception of antenna assembly 82 to the front hemisphere of antenna assembly 82.

Antenna assembly 82 is mounted on the top of a tall (5 meter) wooden pole 84 so that the plane defined by the orientation of the first and second antennae is substantially parallel to the ground (e.g., the X-Z plane). The back side of the plane (the side of radiofrequency reflector 56) faces upwards (skywards) while the front side of the plane faces downwards, towards the ground and other components of service station 80 including refueling pier 66. In such a way, antenna assembly 82 covers the entire volume of service station 80 but receives less interfering signals and noise from the environment. Such a reduction of noise allows transmitting entities having a limited power supply such as vehicle identification tag readers 70 to transmit at relatively low intensities. As low transmission intensities require less power than high transmission intensities, any integrated power supply, such as of vehicle identification tag readers 70 lasts longer without needing maintenance such as recharging or replacing. The reduced maintenance reduces the operations cost of a service station such as service station 80 rendering wireless vehicle identification tag readers 70 and active second wireless vehicle identification tags (as discussed in the PCT patent applications published as WO 2007/049273 and WO 2007/049274) practical.

Any suitable method of establishing and maintaining wireless communication may be used in a service station such as service station 80. In embodiments, establishing wireless communication in a service station such as service station 80 is substantially similar to the discussed above with reference to service station 80.

In service station 80, antenna assembly 82 is mounted 5 meters above the ground, providing antenna assembly 82 with an unobstructed line of sight to virtually any relevant entity (transmitter or receiver) in service station 80. In some embodiments, an antenna assembly is mounted lower, e.g. 3 meter or 4 meter and in some embodiments higher than 5 meters above the ground. The height is determined by many factors, in some embodiments including the expected height of tall vehicles (e.g., trucks) and the size of the service station.

In service station 80, antenna assembly 82 is mounted on the top of a radiotransparent pole 84 made of wood. In related embodiments, an analogous antenna assembly is mounted in some other suitable fashion, for example so as to hang from a cable suspended between two or more poles or like structures. When an antenna assembly is hanging from some object, for example from a cable, the supports for the object are not necessarily radiotransparent and in some embodiments are radioopaque or radio reflective.

In service station 80, antenna assembly 82 is provided with a radiofrequency reflector 56 that limits the azimuth of reception of antenna assembly 82 to the front hemisphere of antenna assembly 82. In some embodiments, a radiofrequency reflector is provided that limits the azimuth of reception even more, for example, to a spherical section smaller than a hemisphere or some other section. Generally, such a radiofrequency reflector is configured so that the azimuth of reception, at the very least, includes the entire volume of the service station from which communications through the antenna assembly is expected and generally contains the vicinity of all fuel dispensing locations.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. For example, in the application and the claims the term "service station" is to be interpreted broadly to include, for example, service stations, gas stations and other venues where fuel is distributed. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of establishing wireless communication in a service station, comprising:
    a) providing an antenna assembly including at least two transmission antennae and at least two reception antennae, said antenna assembly comprises:
        i) a first linearly polarized radio frequency antenna; and
        ii) a second linearly polarized radio frequency antenna, positioned so that the orientation of said second antenna is at an angle relative to the orientation of said first antenna so as to define a plane having a front side and a back side;
        said first antenna and said second antenna are configured to function as substantially independent reception antennae;
    b) providing a service station controller comprising a transmitter functionally associated with said transmission antennae and a receiver functionally associated with said reception antennae;
    c) providing at least one entity, each said entity comprising a vehicle identification tag reader functionally associated with a fuel-dispensing location and comprising a dedicated transceiver and an antenna, said tag reader antenna being mounted on a fuel-dispensing nozzle of said fuel-dispensing location; wherein said service station controller and said entities are configured for mutual two-directional communication using said service station controller transmitter and receiver and said entity transceivers, and where each said entity is identifiable to said service station controller;
    d) said service station controller transmitting a signal to a specific entity using at least two transmission antennae of said antenna assembly;
    e) subsequently to d), said service station controller listening for a response from said specific entity using at least one reception antenna of said antenna assembly; and
    f) subsequently to e), from amongst said reception antennae, selecting a single reception antenna for further communication between said service station controller and said specific entity.

2. The method of claim 1, wherein said vehicle identification tag reader is mounted on said fuel-dispensing nozzle of said fuel-dispensing location.

3. The method of claim 1, said antenna assembly mounted on a structure so that said back side of said plane defined by said first and second antennae substantially faces said structure.

4. The method of claim 1, wherein said transmission antennae and said reception antennae are different antennae.

5. The method of claim 1, wherein said transmission antennae and said reception antennae are the same antennae.

6. The method of claim 1, wherein said transmission of said signal to said specific entity is simultaneous through at least two said transmission antennae.

7. The method of claim 1, wherein said transmission of said signal to said specific entity is serially through at least two said transmission antennae.

8. The method of claim 1, wherein said single reception antenna selected is the antenna determined as having best reception of signals transmitted from said specific entity.

9. The method of claim 1, wherein said single reception antenna selected is the first antenna determined as having sufficient reception of signals transmitted from said specific entity.

10. The method of claim 1, wherein said receiver of said service station controller is configured to receive signals at at least two different frequencies;
wherein said listening for a response from said specific entity includes receiving signals at at least two different frequencies of said at least two different frequencies; and
wherein said selecting a single reception antenna includes selecting a reception frequency from amongst said at least two different frequencies.

11. The method of claim 1, wherein said antenna further comprises:
iii) a radio frequency receiver functionally associated with said first antenna and said second antenna.

12. The method of claim 1, wherein said antenna assembly said first antenna is an omnidirectional antenna.

13. The method of claim 1, wherein said antenna assembly said second antenna is an omnidirectional antenna.

14. The method of claim 1, wherein said antenna assembly said first antenna and said second antenna are configured for reception of substantially the same wavelengths.

15. The method of claim 1, wherein said antenna assembly said angle between said orientation of said first antenna and said orientation of said second antenna is not less than about 45°.

16. The method of claim 1, wherein said antenna assembly further comprises a radio frequency reflector configured to reflect radio frequency radiation to a front side of said plane defined by said orientation of said first and second antennae.

17. The method of claim 1, wherein said antenna assembly said first antenna and said second antenna are configured to function as transmission antennae.

18. The method of claim 17, wherein said antenna assembly said first antenna is configured to function as a transmission antenna substantially independently from said second antenna.

19. The method of claim 17, wherein said antenna assembly, a radio frequency transmitter is functionally associated with said first antenna and said second antenna.

20. The method of claim 1, wherein said antenna assembly further comprises:
iv) a third linearly polarized radio frequency antenna; and
v) a fourth linearly polarized radio frequency antenna, positioned so that the orientation of said fourth antenna is at an angle relative to the orientation of said third antenna so as to define a plane having a front side and a back side;
wherein said third antenna and said fourth antenna are configured to function as transmission antennae.

21. The method of claim 20, wherein said antenna assembly said third antenna is configured to function as a transmission antenna substantially independently from said fourth antenna.

22. The method of claim 20, wherein said antenna assembly further comprises:
vi) a radio frequency transmitter functionally associated with said third antenna and said fourth antenna.

23. The method of claim 20, wherein said antenna assembly said third antenna and said fourth antenna are configured for transmission of substantially the same wavelengths.

24. The method of claim 20, wherein said antenna assembly said angle between said orientation of said third antenna and said orientation of said fourth antenna is not less than about 45°.

25. The method of claim 20, wherein said antenna assembly said plane defined by said orientation of said third and fourth antennae is substantially parallel to or includes said plane defined by said orientation of said first and second antennae.

26. The method of claim 20, wherein said antenna assembly further comprises:
vi) a sixth linearly polarized radio frequency antenna, positioned so that the orientation of said sixth antenna is substantially not-coplanar with said plane defined by said orientation of said third and fourth antennae, said sixth antenna configured to function as a transmission antenna.

27. The method of claim 26, wherein said antenna assembly further comprises:
vii) a radio frequency transmitter functionally associated with said third antenna, said fourth antenna and said sixth antenna.

28. The method of claim 27, wherein said antenna assembly said third antenna and said sixth antenna are configured for transmission of substantially the same wavelengths.

29. The method of claim 1, wherein said antenna assembly further comprises:
vii) a fifth linearly polarized radio frequency antenna, positioned so that the orientation of said fifth antenna is substantially not-coplanar with said plane defined by said orientations of said first and second antennae, said fifth antenna configured to function as a reception antenna.

30. The method of claim 29, wherein said antenna assembly said fifth antenna is configured to function as a reception antenna substantially independently from said first antenna and said second antenna.

31. The method of claim 29, wherein said antenna assembly further comprises:
viii) a radio frequency receiver functionally associated with said first antenna, said second antenna and said fifth antenna.

32. The method of claim 29, wherein said antenna assembly said first antenna and said fifth antenna are configured for reception of substantially the same wavelengths.

33. The method of claim 29, wherein said antenna assembly said fifth antenna is configured to function as a transmission antenna substantially independently from said first antenna and said second antenna.

34. A method of establishing wireless communication in a service station, comprising:
a) providing an antenna assembly including at least two transmission antennae and at least two reception antennae, said antenna assembly comprises:
i) a first linearly polarized radio frequency antenna; and
ii) a second linearly polarized radio frequency antenna, positioned so that the orientation of said second antenna is at an angle relative to the orientation of said first antenna so as to define a plane having a front side and a back side;
said first antenna and said second antenna are configured to function as substantially independent reception antennae;
b) providing a service station controller comprising a transmitter functionally associated with said transmission antennae and a receiver functionally associated with said reception antennae, said receiver of said service station controller is configured to receive signals at at least two different frequencies;
c) providing at least one entity, each said entity comprising a dedicated transceiver and an antenna wherein said service station controller and said entities are configured for mutual two-directional communication using said service station controller transmitter and receiver and said entity transceivers, and where each said entity is identifiable to said service station controller;
d) said service station controller transmitting a signal to a specific entity using at least two transmission antennae of said antenna assembly;
e) subsequently to d), said service station controller listening for a response from said specific entity using at least one reception antenna of said antenna assembly, and receiving signals at at least two different frequencies of said at least two different frequencies; and
f) subsequently to e), from amongst said reception antennae, selecting a single reception antenna for further communication between said service station controller and said specific entity, including selecting a reception frequency from amongst said at least two different frequencies.

35. The method of claim 34, wherein said entity comprises a vehicle identification tag reader functionally associated with a fuel-dispensing location and comprising a dedicated transmitter and an antenna.

36. The method of claim 35, said antenna of said vehicle identification tag reader is mounted on a fuel-dispensing nozzle of said fuel-dispensing location.

37. The method of claim 35, wherein said vehicle identification tag reader is mounted on said fuel-dispensing nozzle of said fuel-dispensing location.

38. The method of claim 34, wherein said entity comprises a vehicle mounted transmitter including a dedicated transmitter and an antenna.

39. The method of claim 34, said antenna assembly mounted on a structure so that said back side of said plane defined by said first and second antennae substantially faces said structure.

40. The method of claim 34, wherein said transmission antennae and said reception antennae are different antennae.

41. The method of claim 34, wherein said transmission antennae and said reception antennae are the same antennae.

42. The method of claim 34, wherein said transmission of said signal to said specific entity is simultaneous through at least two said transmission antennae.

43. The method of claim 34, wherein said transmission of said signal to said specific entity is serially through at least two said transmission antennae.

44. The method of claim 34, wherein said single reception antenna selected is the antenna determined as having best reception of signals transmitted from said specific entity.

45. The method of claim 34, wherein said single reception antenna selected is the first antenna determined as having sufficient reception of signals transmitted from said specific entity.

* * * * *